(12) United States Patent
Shang et al.

(10) Patent No.: US 10,423,498 B2
(45) Date of Patent: Sep. 24, 2019

(54) ZERO DATA LOSS TRANSFER PROTOCOL

(71) Applicants: Heping Shang, Walnut Creek, CA (US); Ming-Chen Lo, Fremont, CA (US); Elena Lora-Gallardo, Issy les Moulineaux (FR); Xia-ge Dai, Shanghai (CN)

(72) Inventors: Heping Shang, Walnut Creek, CA (US); Ming-Chen Lo, Fremont, CA (US); Elena Lora-Gallardo, Issy les Moulineaux (FR); Xia-ge Dai, Shanghai (CN)

(73) Assignee: SYBASE, INC., Dublin, CA (US)

( * ) Notice: Subject to any disclaimer, the term of this patent is extended or adjusted under 35 U.S.C. 154(b) by 542 days.

(21) Appl. No.: 14/446,172

(22) Filed: Jul. 29, 2014

(65) Prior Publication Data

US 2015/0378845 A1 Dec. 31, 2015

(30) Foreign Application Priority Data

Jun. 26, 2014 (EP) .................................. 14290186

(51) Int. Cl.
*G06F 16/00* (2019.01)
*G06F 11/14* (2006.01)
*G06F 11/16* (2006.01)
*G06F 11/20* (2006.01)
(Continued)

(52) U.S. Cl.
CPC ...... *G06F 11/1471* (2013.01); *G06F 11/1474* (2013.01); *G06F 11/165* (2013.01); *G06F 11/2012* (2013.01); *G06F 11/2082* (2013.01);
*G06F 16/1865* (2019.01); *G06F 16/2308* (2019.01); *G06F 11/2094* (2013.01);
(Continued)

(58) Field of Classification Search
CPC ............. G06F 11/1171; G06F 16/2308; G06F 16/1865; G06F 11/2012; G06F 11/165; G06F 11/1474; G06F 11/2082; G06F 11/2094; G06F 2201/85; G06F 2201/84; G06F 2201/80
See application file for complete search history.

(56) References Cited

U.S. PATENT DOCUMENTS 6,510,421 B1 * 1/2003 Ganesh ............ G06F 17/30362
2008/0222159 A1 * 9/2008 Aranha ............ G06F 17/30289

* cited by examiner

*Primary Examiner* — Paul Kim
(74) *Attorney, Agent, or Firm* — Schwegman Lundberg & Woessner, P.A.

(57) ABSTRACT

A method for reliable data synchronization within a network is disclosed. The producer system stories data in a persistent data store and produces one or more data updates. The producer system simultaneously transmits the data updates to a consumer system and initiating storage of the data updates at the producer system. When storage of the data updates at the producer system is complete, the producer system transmits a first acknowledgment to the consumer system. The producer system determines whether a second acknowledgment has been received from the consumer system, wherein the second acknowledgment indicates that the consumer system has successfully stored the data updates at the consumer system. In accordance with a determination that the second acknowledgment has been received from the consumer system, the producer system changes the temporary status of the data updates stored at the producer system to a permanent status.

20 Claims, 7 Drawing Sheets

(51) Int. Cl.
*G06F 16/18* (2019.01)
*G06F 16/23* (2019.01)

(52) U.S. Cl.
CPC ...... *G06F 2201/80* (2013.01); *G06F 2201/84* (2013.01); *G06F 2201/85* (2013.01)

ZERO DATA LOSS TRANSFER PROTOCOL

CLAIMS OF PRIORITY

The present patent application claims the priority benefit of the filing date of European Application (EPO) No. 14 290 186.7 filed Jun. 26, 2014, the entire content of which is incorporated herein by reference.

TECHNICAL FIELD

The disclosed example embodiments relate generally to the field of network data storage, and in particular to the field of reliable data synchronization within a network.

BACKGROUND

The rise of the computer age has resulted in increased access to personalized services online. As the cost of electronics and networks drop, many services that were previously provided in person are now provided remotely over the Internet. For example, banking services can now be provided entirely through a networked system, as users can instruct the system to complete deposits withdrawals, and other transactions and receive notification that these transactions have been completed.

As more and more services are provided online, large amounts of data are generated consistently. Much of this data needs to be saved for later use. For example, banking transactions, messages, search histories, browsing histories, statistical analysis of data, all, generally, needs to be saved to be useful in the future. With so much data needing to be saved, storage systems need to be able to accommodate a large amount of data reliably. However, such systems are generally unable to guarantee that all of the storage components will operate completely error free and failure free. As such, large storage systems often operate over a network to store multiple copies of important data at multiple locations. This improves the reliability and usefulness of a storage system. This data must be transferred to backup locations without data loss or corruption.

Large data stores also facilitate data recovery in case of a crash by storing a transaction log for a given database. Thus, each time data in the database is changed, the change is recorded in a transaction log. This allows all the changes to be stored in a relatively compact form. Then, if the database crashes, the transaction log can be used to rebuild a correct and up to date version of the database. This can accomplished by reapplying all the changes in the correct order to the original data set.

The other major consideration is the speed with which data can be reliably stored. To improve the speed at which storage systems work, it is important to identify bottlenecks in the process. Once a bottleneck (e.g., a particular part of a system that delays the entire process) is identified, it can be removed or ameliorated. In traditional networked storage systems, one such bottleneck is the time needed to log and store data at the system that produced the data before beginning to distribute it.

DESCRIPTION OF THE DRAWINGS

Some example embodiments are illustrated by way of example and not limitation in the Figures of the accompanying drawings, in which.

Like reference numerals refer to the same or similar parts throughout the drawings.

DETAILED DESCRIPTION

Figure 1:
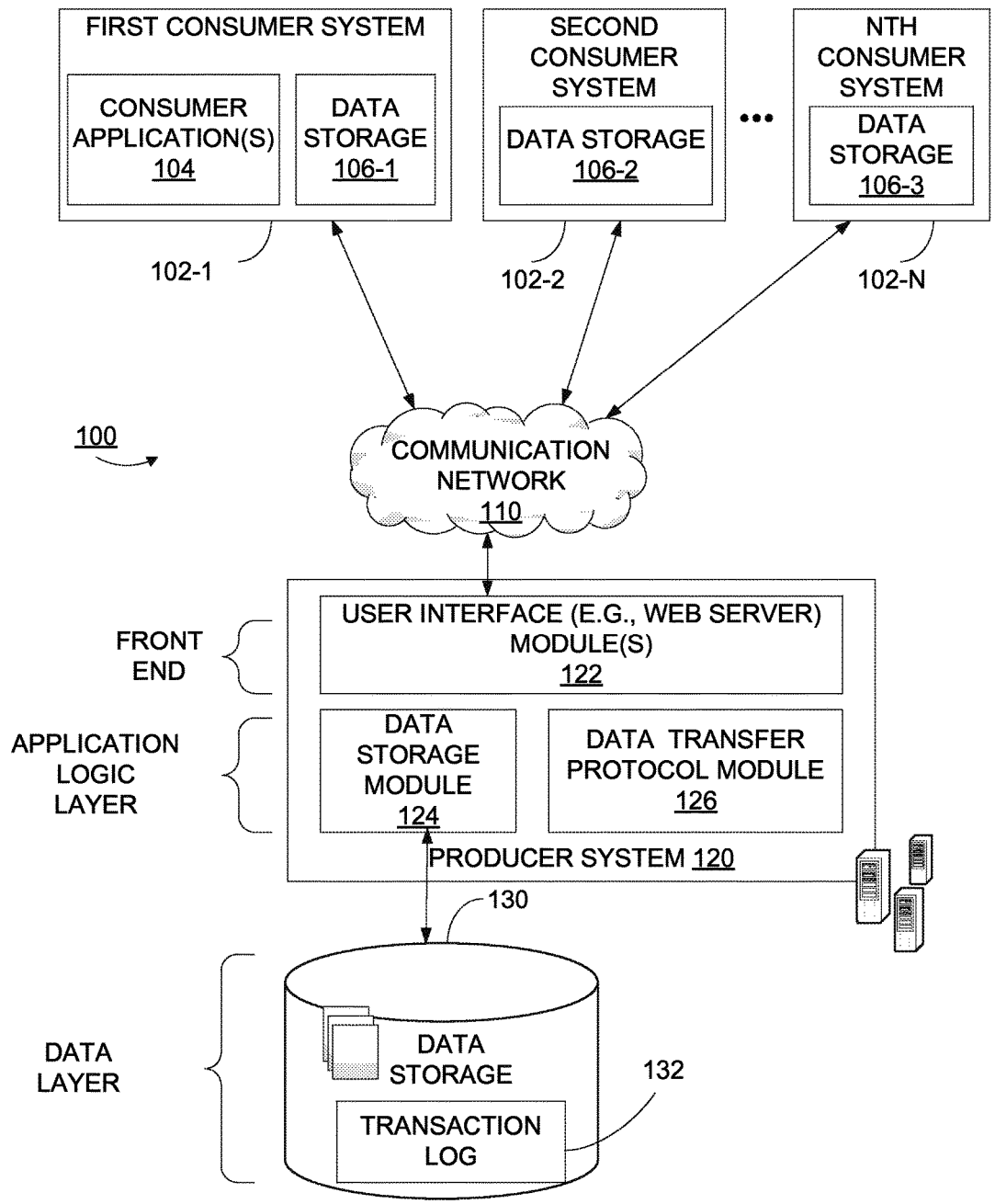
FIG. 1 is a network diagram depicting a producer-consumer system, in accordance with an example embodiment, that includes various functional components of a data storage system.

The present disclosure describes methods, systems and computer program products for transferring data with zero data loss within a networked data storage system. In the following description, for purposes of explanation, numerous specific details are set forth to provide a thorough understanding of the various aspects of different example embodiments. It will be evident, however, to one skilled in the art, that the any particular example embodiment may be practiced without all of the specific details and/or with variations permutations and combinations of the various features and elements described herein.

When a computer system generates data updates, those data updates should be stored. In some example embodiments, storage is accomplished with a producer/consumer model of data storage. In this case, when the producer system has generated the data updates, it begins to store the newly produced data updates at the persistent storage associated with the producer system and simultaneously transmits the data for storage at one or more consumer systems. Storing the data updates includes updating the data store to include the new data updates and storing the data changes in a transaction log on the producer system. The transaction log can keep a chronological record of the changes made to the data stored in the data storage associated with the producer system. The transaction log can also be called a change log, a log file, or a data change log. These terms may be used interchangeably within this document.

Conventional storage systems encounter a performance bottleneck when logging data changes to the data log. For example, a single transaction can include multiple individual changes that each should be written to a change log (sometimes sequentially). As a result, there can be a large delay before the data changes are even sent to a remote storage system (e.g., a consumer system).

By simultaneously logging (and storing) the data updates and transmitting the data updates for logging at a consumer system, the producer system avoids the bottleneck that would otherwise occur when waiting for the data updates to finish being stored at the persistent data store associated with the producer system. For example, if many data items are to be logged or stored in the persistent data storage, it might take a considerable amount time before new data A is completely stored. If the producer system had to wait until storage was complete before sending the new data A off to the consumer system, the total time would be approximately:

> Time to store(and/or log the changes)at producer system+time to transmit to consumer system+time to store(and/or log)at consumer system+time to notify producer that the data was successfully stored.

In contrast, if the data was transmitted to the consumer system at the same time as it was sent to the persistent store of the producer system, the transmitting, storing, and notifying could have already been completed by the time the producer system finished storing the new data A, resulting in a run time equal to the time to store new data A in the producer persistent store. Of particular importance in a large system is the storing of data changes in a transaction log. In a large data system, the system simultaneously receives (or produces) and stores a variety of data changes. However, because the transaction log should maintain a specific order to ensure that it will reliably return the data to its original state, these changes cannot be recorded simultaneously. Instead, each change is added to the transaction log individually. Thus, storing changes to the transaction log can take much more time than storing the actual data updates in the persistent data storage. By allowing the consumer system to begin storing the data updates while the data logging takes place, the bottleneck effect of the data logging can be mitigated.

In some example embodiments, the consumer system responds to receiving data changes for logging and/or storage by sending a data received acknowledgement back to the producer system, letting the producer system know that the data changes have been received and the consumer will begin logging the data updates.

It should be noted that the term "producer system" includes any system that generates data that needs to be stored. In some example embodiments, the role of the producer system is performed by a server system and the role of the consumer system is performed by a client system. Also, data updates include any new data that needs to be stored, including but not limited to new data generated by the producer system, changes to existing data on the producer system, a list of data changes, or data received from an outside source that needs to be stored.

In some example embodiments, policies associated with data storage and retention determine whether the data should be stored and how/where it will be stored. For example, data that represents a particular banking transaction has one or more replicas at one or more locations to ensure that the data is widely available and not corrupted and lost. In other examples, the policies determine whether consumer systems store a full set of data or just a log of changes.

In some example embodiments, data updates are initially stored in a temporary form in a persistent data store before the data updates are committed to a final version. In addition, the data updates can be stored as a series of changes in a log file (or a transaction log), such that the data can be rebuilt from the log file if a failure occurs. Thus, having a full and accurate log file at each consumer system is crucial to maintain data integrity.

In some example embodiments, the producer system fails in such a way that it cannot be recovered. In this case, the data set cannot be rebuilt on the producer system. Instead, one of the consumer systems is promoted to act as the new producer system. The full data set is rebuilt at the new producer system, if necessary, using the log data.

Once the date updates are stored and the transaction log is updated, the producer system sends a producer acknowledgment message to the consumer system. The producer acknowledgement message indicates that the new data updates have been successfully stored in the persistent data storage that is associated with the producer system and the changes have been logged into a transaction log. It is important to note that this acknowledgement is sent independent of anything occurring at the consumer system. Thus, the producer system sends the acknowledgement message to the consumer without waiting for any additional information or notification. In some example embodiments, the acknowledgement message is sent along with the next available data storage message to the consumer. If no additional data logging messages are scheduled to be sent, producer acknowledgement message can be sent independently. In other embodiments, the acknowledgement message is sent independently as soon as the changes have been logged. In some example embodiments the acknowledgement sent when logging the changes is complete, regardless of whether the data updates have been stored yet.

In some example embodiments committing changes means to finalize the changes or new data as final or permanent and make them available for access to anyone with the appropriate permissions. In some example embodiments committing data is accomplished by moving data to a particular data store or portion of a data store. In other example embodiments committing means changing an indicator associated with the data to indicate its finality. For example, each data section has an associated "Final" value indicator. While the data is still temporary, the Final value indicator is set to 0 or False, indicating the data is not yet finalized. When the data is committed (i.e., finalized) the value is set to 1 or True, indicating that the data is considered final.

In some example embodiments the producer and consumer systems work in a synchronized fashion, such that the data at the producer system is not committed as final until the consumer system sends a consumer acknowledgement message to the producer system. Thus, the consumer system transmits the consumer acknowledgement message to the producer when the data updates are successfully stored at the persistent storage associated with the consumer system. It is important to note that both the producer acknowledgement message and the consumer acknowledgement message are sent independently from each other.

Once the consumer acknowledgement message is received by the producer system, the producer system commits the newly updated data to its persistent storage. The producer system is free to process other transactions and send data changes to any other consumer systems while awaiting the consumer acknowledgement message. In this way, the producer system can send and receive data from any number of consumer systems simultaneously.

The newly updated data is only considered finally committed once both systems have received acknowledgment messages from the other (e.g., the producer system has received the consumer acknowledgement message and the consumer system has received the producer acknowledgment message). In this way, committed data is guaranteed to be the same at both systems. However, if either the producer system or the consumer system fails or has an error, prior to sending their respective acknowledgement message, the process can begin again to ensure that both sides have an accurate copy of the newly updated data.

In some example embodiments this failure is determined based on failure reporting mechanisms of the overall storage system. For example, a large storage system includes systems that periodically poll the various components to ensure that they are working correctly. When one of these tests fails, the system knows that the component has failed and begins recovery procedures. In another example, the individual components of the overall data system (e.g., producer or consumer systems) include the capability to detect failures within themselves and the ability to send a failure report to the overall data storage system.

In other example embodiments the failure is determined when a predetermined amount of time has passed without receiving an acknowledgement message. For example, the producer system sends newly updated data for storage to consumer system A and then sends the producer acknowledgement one microsecond later. After waiting for ten seconds (note that this is an arbitrarily chosen predetermined amount of time; a storage system could choose any amount of time that met their needs) without receiving a consumer acknowledgement message, the producer system determines that a failure has occurred at the consumer system during the process of storing the newly updated data. The producer system then determines whether to begin the data update process again. In this way, the newly updated data is not available for use until it is committed at both the producer and the consumer sides.

In some example embodiments data transfer between the producer system and the consumer system are performed in an asynchronous fashion. When data transfer is performed asynchronously, data may be finally committed on one system (either the producer or consumer) without being committed on the second system. This may result in faster times, but can also result in differences between the data committed at the producer and consumer if one of those systems has a failure during the data update process.

FIG. 1 is a network diagram depicting a consumer-producer system 100 that includes various functional components of a producer system 120 in accordance with some example embodiments. The consumer-producer system 100 includes one or more consumer systems 102-1 to 102-N and a producer system 120. One or more communications networks 110 interconnect these components. The communications network 110 may be any of a variety of network types, including local area networks (LAN), wide area networks (WAN), wireless networks, wired networks, the Internet, personal area networks (PAN) or a combination of such networks.

In some example embodiments, a consumer system (e.g., one of 102-1 to 102-N) is an electronic device, such as a personal computer, a laptop, a smartphone, a tablet, a mobile phone or any other electronic device capable of communication over the communication network 110. Some consumer systems 102-1 include one or more consumer applications 104, which are executed by the consumer system 102-1. In some example embodiments, the consumer application(s) 104 includes one or more applications from the set consisting of search applications, communication applications, productivity applications, storage applications, word processing applications, or any other useful applications. The consumer system 102-1 uses the consumer applications 104 to communicate with the producer system 120 and transmit and receive data updates and status messages to and from the producer system 120. The consumer system 102-1 includes data storage 106. The data storage 106 is a persistent data store for storing data as a backup for at least some of the data stored in the data storage 130 associated with the producer system 120.

In some example embodiments the data storage 106 is a simple persistent queue (SPQ). Also, in some example embodiments, the simple persistent queue (e.g., the data storage) stores a sequential list of data changes, rather than the entire data set. By storing only the data changes, the data storage 106-1 minimizes the amount of memory space needed to store the log of data changes while still maintaining the ability to recreate the current version of the data based on the transaction log.

In some example embodiments, the consumer system 102-1 receives a data storage request message from the producer system 120. The data storage request message indicates the data updates that the producer system 120 requests that the consumer system 102-1 store. In some example embodiments, the data updates are delivered in the form of a transaction log, which only includes the changes made since the last data update. In response to receiving the data storage request message, the consumer system 102-1 then stores the data updates in the data storage 106 associated with the consumer system 102-1.

Once the consumer system 102-1 successfully stores the updated data, the consumer system 102-1 transmits a client acknowledgement message to the producer system 120, indicating that the data updates have been successfully stored. The client acknowledgement message is independent of anything going on at the producer system 120. Thus, the client acknowledgement message is sent as soon as possible.

The consumer system 102-1 also receives a server acknowledgement message from the producer system 120, indicating that the producer system 120 has successfully stored the updated data. Once both the consumer system 102-1 and the producer system 120 have acknowledged the successful storage of the data updates or change logs, the producer system 120 commits the data updates to the current version of the data. Once the data has been committed, it can be used and accessed.

In some example embodiments, there are multiple consumer systems (102-1 to 102-N) that connect to and interact with the producer system 120. Each of these interactions can occur simultaneously, depending on the bandwidth and processing power available to the producer system 120 and the various consumer systems 102-1 to 102-N.

In some example embodiments, as shown by way of example in FIG. 1, the producer system 120 is generally based on a three-tiered architecture, consisting of a front-end layer, application logic layer, and data layer. Each module or engine shown in FIG. 1 can represent a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. Various additional functional modules and engines can be used with a producer system 120, such as that illustrated in FIG. 1, to facilitate additional functionality that is not specifically described herein. Furthermore, the various functional modules and engines depicted in FIG. 1 can reside on a single server computer, or can be distributed across several server computers in various arrangements. Moreover, although depicted in FIG. 1 as a three-tiered architecture, the various example embodiments are by no means limited to this architecture.

As shown by way of example in FIG. 1, the front end consists of an interface module (e.g., a server) 122, which receives acknowledgments from various consumer systems 102, and communicates data storage request messages to the appropriate consumer systems 102. For example, the user interface module(s) 122 sends a data storage request message to the first consumer system 102-1. The consumer system 102-1 receives the request and eventually responds by sending a data receipt acknowledgement message to the user interface module(s) 122.

As shown by way of example in FIG. 1, the data layer includes one or more databases that make up the data storage 130. The data storage 130 is persistent data storage and can be made up of any appropriate data storage device or technology. In some example embodiments, the data storage 130 includes a transaction log 132 that records each transaction that occurs on the producer system 120. The transaction log 132 stores a sequential list of changes to the data in the dataset. The transaction log 132 acts as, among other things, a backup tool. If the main database in data storage 130 is lost or corrupted, the producer system 120 can reproduce an up to date version of the data by replaying the entire list of changes from the beginning. The transaction log 132 also has the advantage of being significantly smaller in size than a full backup of the data. However, storing data to the transaction log 132 is significantly slower than storing it in the data storage 130 section because the data changes stored in the transaction log 132 should be saved serially to ensure the integrity of the transaction log 132, while the data storage 130 can store multiple data updates in parallel.

In some example embodiments, the application logic layer includes various application server modules, which, in conjunction with the user interface module(s) 122, enable data to be sent and received from the data storage 130. In addition to the various application server modules, the application logic layer includes the data transfer protocol module 126. As illustrated in FIG. 1, with some example embodiments, the data transfer protocol module 126 is implemented as a service that operates in conjunction with various application server modules. For instance, any number of individual application server modules can invoke the functionality of the data storage module 124 or the data transfer protocol module 126 to include an application server module associated with applications for storing and transferring data. However, with various alternative example embodiments, the data transfer protocol module 126 is implemented as its own application server module such that it operates as a stand-alone application. With some example embodiments, the data transfer protocol module 126 includes or has an associated publicly available application programming interface (API) that enables third-party applications to invoke the functionality of the data transfer protocol module 126.

Generally, when data updates are generated by (or received by) the producer system 120, the data transfer protocol module 126 is responsible for ensuring that the new data updates are stored in the data storage 130 (and transaction log 132) associated with the producer system 120 and stored on at least one consumer system 102. The data transfer protocol module 126 chooses the specific consumer system 102-1 to 102-N on which to store the data updates. Some data updates are specifically associated with a particular consumer system 102. For example, if the data is associated with or owned by a particular consumer system 102, the data transfer protocol module 126 can only select that particular consumer system 102 for data storage. In another example, the data transfer protocol module 126 can select consumer systems 102 that already store related data. In other examples, consumer systems 102 are chosen based on policies associated with the data (e.g., governing what countries can store specific data, where data needs to be stored to provide the best service, etc.) or constraints of the system (e.g., consumer systems 102 that have storage space available).

Once the one or more consumer systems 102 are determined, the data transfer protocol module 126 sends the data updates to the data storage module 124 for storage in the data storage 130 associated with the producer system 120. In some example embodiments, the data updates are a list of data changes to be stored in a transaction log at the consumer system 102-1. In other example embodiments the data updates include both a list of data updates and the data updates themselves. The data transfer protocol module 126 sends the data updates to the determined one or more consumer systems 102-1 to 102-N through the communication network 110 at the same time as it stores the data updates in its own data storage 130.

Once the data updates have been successfully stored by the data storage 130, the data storage module 124 notifies the data transfer protocol module 126 that the storage is complete. In response to the notification, the data transfer protocol module 126 sends a server acknowledgement message to the one or more determined consumer systems 102 to notify them that the data has been successfully stored at the producer system 120.

The data transfer protocol module 126 also receives consumer acknowledgement messages that indicate that the data has been successfully stored at the consumer system 102. The data transfer protocol module 126 continues performing any other needed data storage functions other processes while waiting to receive the consumer acknowledgement message. This allows multiple data transfer processes to happen simultaneously, without having to wait for other processes to finish.

If either the producer system 120 or the consumer system 102 fails or has an error during the data transfer, no acknowledgement will be sent. In this case, the data should be resent. In some example embodiments, the failure of either the producer system 120 or the consumer system 102 is automatically detected and reported by one or more components of the producer system 120. In other example embodiments, if after a predetermined amount of time no acknowledgement is received by the producer system 120, then the producer system 120 determines automatically that an error has occurred with the consumer system 102. For example, the data transfer protocol module 126 waits 1 second (or any other appropriate amount of time) and, if no acknowledgement is received, determines that an error has occurred at a consumer system 102. The producer system 120 can then begin a recovery process to determine whether the consumer system 102 can still be used to store the data updates or if another needs to be selected.

Once both the producer system 120 and the one or more consumer systems 102 have stored the data updates and sent the appropriate acknowledgements, the data updates can be committed as final. Once committed, the data is moved to the live version of data and can be accessed by any users who have permission to access the data.

Figure 2:
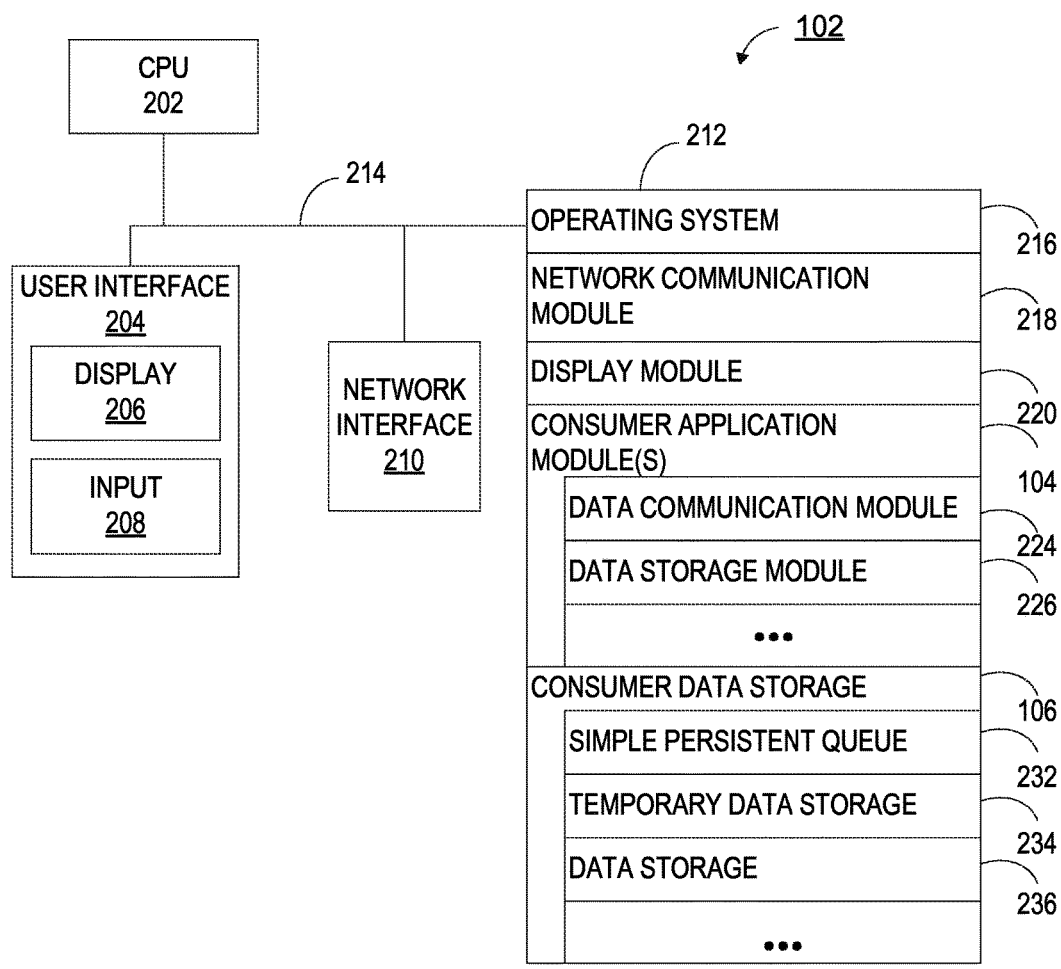
FIG. 2 is a block diagram illustrating a consumer system in accordance with some example embodiments.

FIG. 2 is a block diagram illustrating a consumer system 102 in accordance with some example embodiments. The consumer system 102 can include one or more processing units (CPUs) 202, one or more network interfaces 210, memory 212, and one or more communication buses 214 for interconnecting these components. The consumer system 102 can include a user interface 204. The user interface 204 includes a display device 206 and optionally includes an input means such as a keyboard, mouse, a touch sensitive display, or other input buttons 208. Furthermore, some consumer systems use a microphone and voice recognition to supplement or replace the keyboard.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a non-transitory computer readable storage medium.

In some example embodiments, memory 212 or the computer readable storage medium of memory 212 stores the following programs, modules and data structures, or a subset thereof:
- an operating system 216 that includes procedures for handling various basic system services and for performing hardware dependent tasks;
- a network communication module 218 that is used for connecting the consumer system 102 to other computers via the one or more communication network interfaces 210 (wired or wireless) and one or more communication networks, such as the Internet, other wide area networks, local area networks, metropolitan area networks, etc.;
- a display module 220 for enabling the information generated by the operating system 216 and consumer applications 104 to be presented visually on the display device 206;
- one or more consumer application modules 104 for handling various aspects of interacting with the producer system (e.g., 120 of FIG. 1), including but not limited to:
  - a data communication module 224 for receiving data storage request messages from the producer system 120 and sending consumer acknowledgement messages to the producer system 120;
  - a data storage module 226 for storing data updates in the persistent storage associated with the consumer system 102 and for reporting successful storage of the data updates; and
- a consumer data storage 106 for storing data at the consumer system 102, including but not limited to:
  - a simple persistent queue 232 for storing a list of data changes that were sent from the producer system 120;
  - a temporary data storage 234 for storing data updates from the producer system 120 prior to their being committed as final into the simple persistent queue 232; and
  - data storage 236 for storing data received from the producer system 120.

Figure 3:
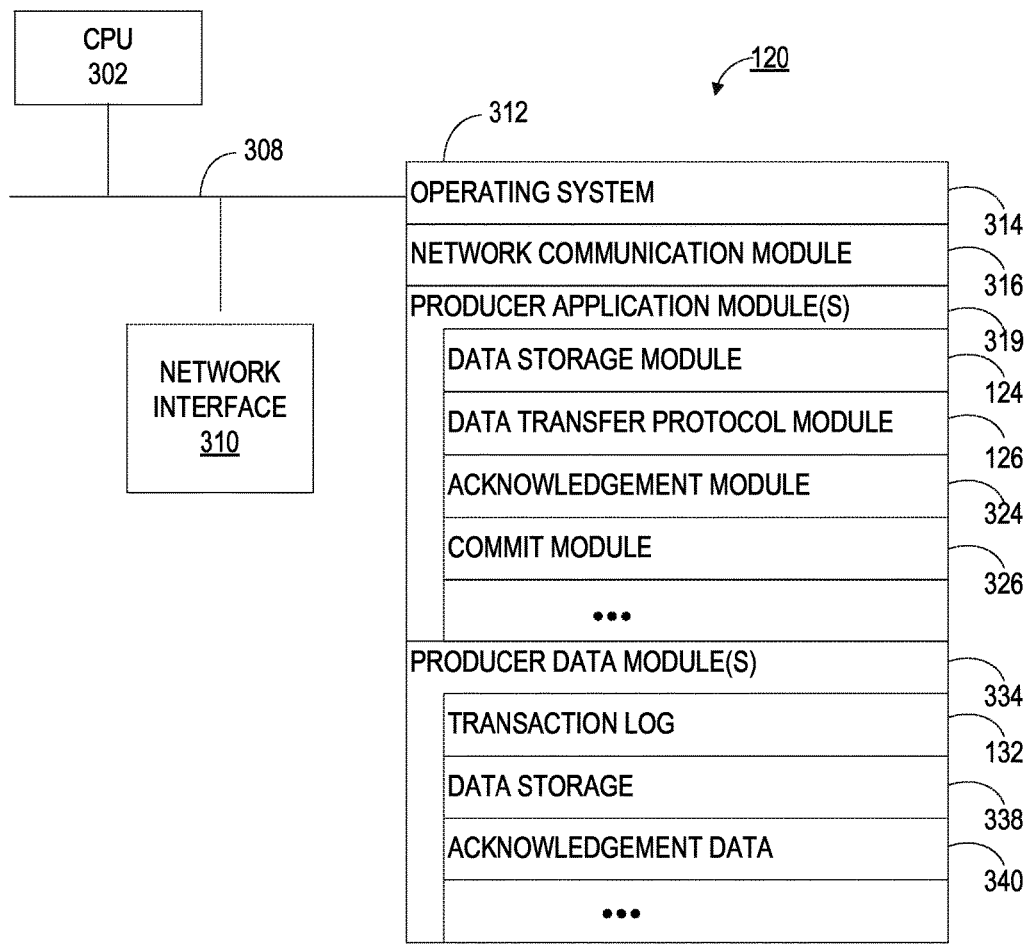
FIG. 3 is a block diagram illustrating a producer system in accordance with some example embodiments.

FIG. 3 is a block diagram illustrating a producer system 120 in accordance with some example embodiments. The producer system 120 can include one or more processing units (CPUs) 302, one or more network interfaces 310, memory 312, and one or more communication buses 308 for interconnecting these components. Memory 312 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 312 may optionally include one or more storage devices remotely located from the CPU(s) 302.

Memory 312, or alternately the non-volatile memory device(s) within memory 312, comprises a non-transitory computer readable storage medium. In some example embodiments, memory 312 or the computer readable storage medium of memory 312 stores the following programs, modules and data structures, or a subset thereof:
- an operating system 314 that includes procedures for handling various basic system services and for performing hardware dependent tasks;
- a network communication module 316 that is used for connecting the producer system 120 to other computers via the one or more communication network interfaces 310 (wired or wireless) and one or more communication networks, such as the Internet, other wide area networks, local area networks, metropolitan area networks, and so on;
- one or more producer application modules 319 for performing the services offered by producer system 120, including but not limited to:
  - a data storage module 124 for storing data updates in the transaction log 132 and the data storage 130 associated with the server 120;
  - a data transfer protocol module 126 for ensuring that newly generated data updates are adequately stored on the producer system 120 and one or more consumer systems 102;
  - an acknowledgement module 324 for generating producer acknowledgement messages when the data updates have been successfully stored in data storage 130 associated with the producer system 120; and
  - a commit module 326 for committing the data once both the producer system 120 and the one or more consumer systems 102 have both acknowledged that the data has been successfully stored in their respective data storage;
- producer data modules 334, holding data related to the producer system 120, including but not limited to:
  - a transaction log 132 including a list of all data changes made to the data stored on the producer system 120 (or any particular data set);
  - data storage 130 including at least some data generated by the producer system 120; and
  - acknowledgement data 340 including consumer acknowledgement messages received from consumer systems 102.

Figure 4:
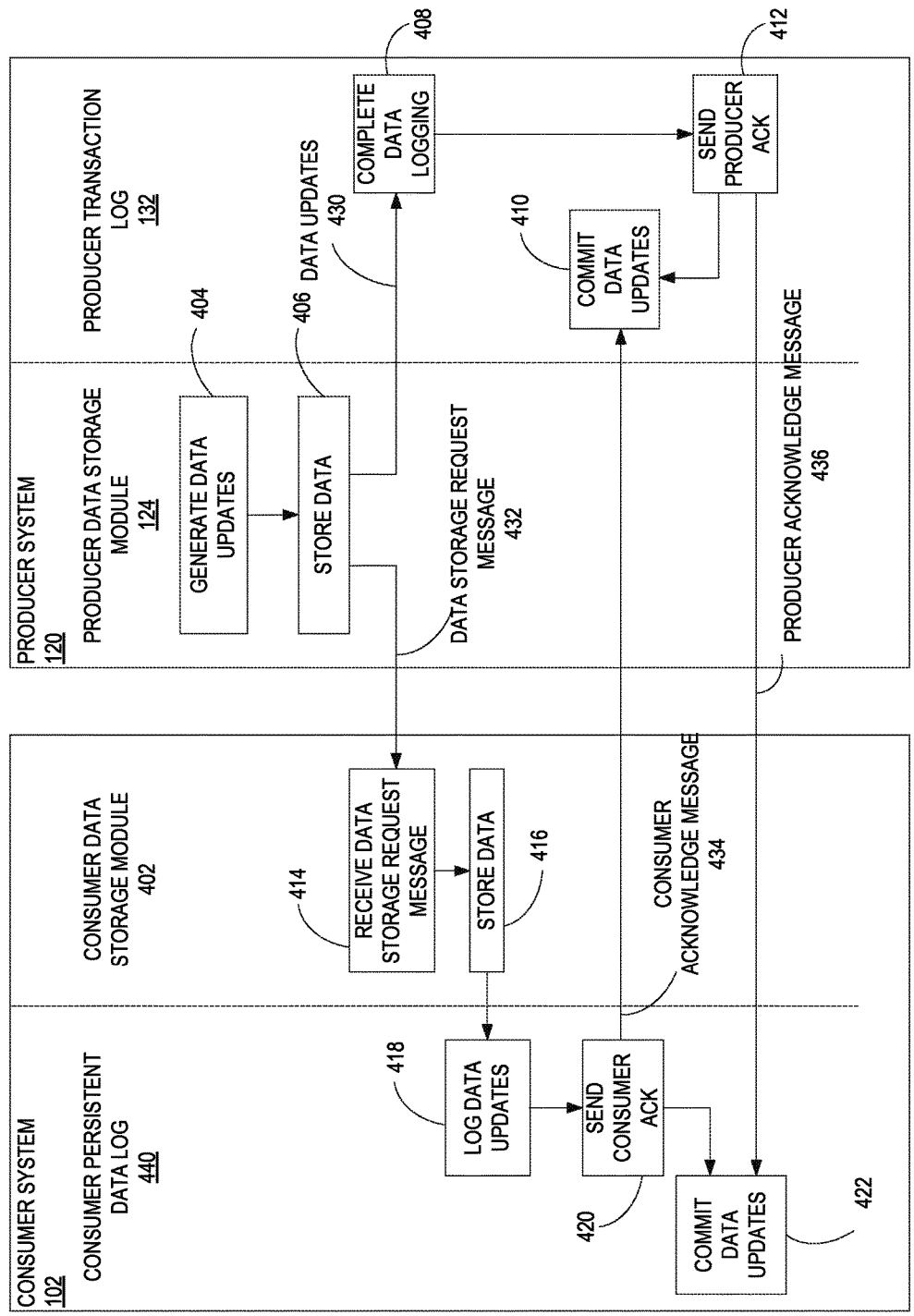
FIG. 4 depicts a flow diagram illustrating a method, in accordance with an example embodiment, of transferring storage data without risk of data loss in accordance with some example embodiments.

FIG. 4 depicts a flow diagram illustrating a method 400 of transferring storage data without risk of data loss in accordance with some example embodiments. In accordance with some example embodiments, the producer data storage module 124 generates (404) data updates. Generating data updates includes producing new data, producing changes to existing data, and receiving new data or changes to existing data from a source outside of the producer system 120. The data updates can also include a list of changes that represent one or more changes that have been made to the data stored on the server system 120. In some example embodiments the data updates include both the updated data itself and a listing of the changes for a log.

The producer data storage module 124 then simultaneously stores (406) the data updates at both the producer system 120 and the consumer system 102. To accomplish this goal the producer system 120 sends the data updates 430 to be logged at the producer transaction log 132. In some cases, this happens after being stored (406) in the data storage (e.g., 130 of FIG. 1) of the producer system. In other example embodiments, the data updates 430 are stored and logged simultaneously.

The producer data storage module 124 simultaneously sends the data updates 430 to the producer transaction log 132 and sends a data storage request message 432 to the consumer system 102. In this way both the consumer system 102 and the producer system 120 can work on storing/logging the data concurrently, cutting down on the overall time need to store the data.

The producer transaction log 132 receives the data updates 430 (e.g., a list of data changes) and begins the process of logging the changes. In some example embodiments, the data updates are both recorded in a log and stored in a storage system. Once logging of the data updates is complete (408) the producer transaction log 132 sends (412) a producer acknowledgement message to the consumer system 102.

In some example embodiments the consumer data storage module 402 receives (414) the data storage request message 432 from the producer data storage module 124. The consumer data storage module 402 then stores the data (416) in the consumer persistent data storage 106. In some example embodiments storing the data involves updating a transaction log (418) to reflect the changes to the data. Once the changes are logged, the consumer persistent data storage 106 sends (420) a consumer acknowledgement message 434 to both the producer system 120 and the consumer system 102.

When the producer system 120 receives both a consumer acknowledgement message 434 and a producer acknowledgement message 436, the producer transaction log 132 commits (410) the data updates as final. Similarly, the consumer persistent data storage 106 commits (422) the data updates as final on its own persistent data log 440 only when both acknowledgement messages (434 and 436) have been received. In this way the data on both systems (consumer system 102 and producer system 120), once committed, is guaranteed to be the same.

If no acknowledgment message is received from one of the two systems 102, 120, or failure of one of the two systems 102, 120 is otherwise detected, a recovery method is instigated. If the error is repairable within a short amount of time, the data transfer can begin again from wherever the data storage and transfer process left off. If not, the entire process may need to begin again.

Figure 5A:
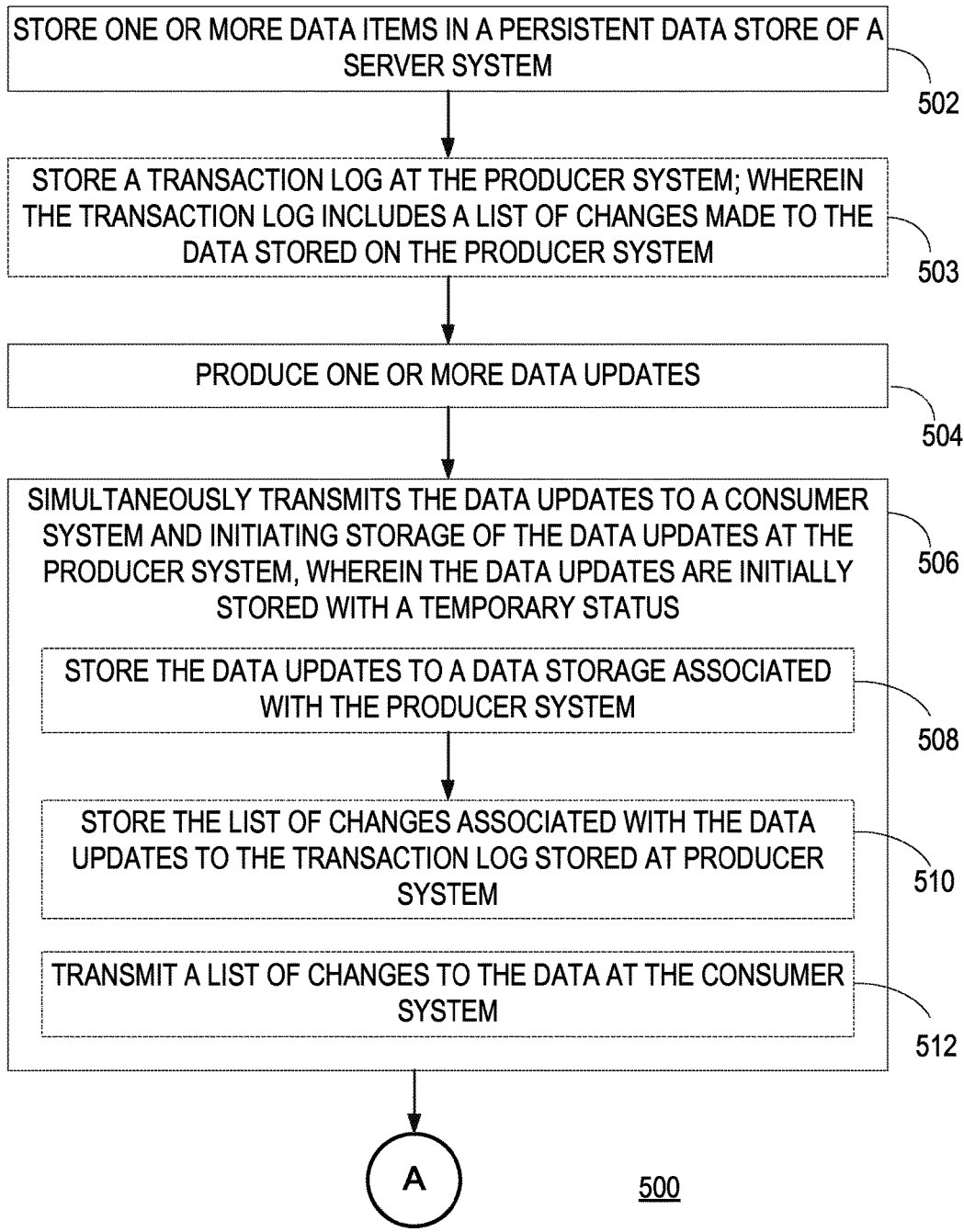
FIGS. 5A and 5B are a flow diagram illustrating a method, in accordance with an example embodiment, for transferring and storing data with zero data loss in accordance with some example embodiments.

FIG. 5A is a flow diagram illustrating a method 500 for transferring and storing data with zero data loss in accordance with some example embodiments. Each of the operations shown in FIG. 5A may correspond to instructions stored in a computer memory or computer readable storage medium. Optional operations are indicated by dashed lines (e.g., boxes with dashed-line borders). In some example embodiments, the method described in FIG. 5A is performed by the producer system (e.g., 120 in FIG. 1).

In some example embodiments, the producer system (FIG. 1, 120) stores (502) one or more data items in a persistent data storage (e.g., data storage 130) of the producer system (FIG. 1, 120). In some example embodiments, the producer system (FIG. 1, 120) also stores (503) a transaction log, wherein the transaction log includes a list of changes made to the data stored on the producer system. For example, each time data changes, a log of the change is stored in the transaction log. Thus, when the data in row 15 is changed from "Apple" to "Orange" the transaction log records only the details needed to replicate that change (e.g., row 15, original value "Apple", new value "Orange.") In this way, if the data is lost or corrupted, it can be reconstructed by replaying the transaction log of data changes.

The producer system (FIG. 1, 120) produces (504), at one or more processors located at the producer system 120, one or more data updates. In some example embodiments the one or more data updates include an updated version of the one or more data items stored in the persistent data storage of the producer system (FIG. 1, 120). In other example embodiments the data updates include a list of changes made as a result of the data updates.

The producer system (FIG. 1, 120) simultaneously transmits (506) the data updates to a consumer system and initiates storage of the data updates at the producer system, wherein the data updates are initially stored with a temporary status. Storing data at the producer system includes ensuring that the produced data updates are recorded at the server system. There is more than one method for storing data at the producer system. In some example embodiments, the producer system (FIG. 1, 120) stores (508) the data updates to data storage associated with the producer system. Then the producer system (FIG. 1, 120) stores (510) a list of changes associated with the system updates to the transaction log stored at the producer system (FIG. 1, 120).

In some example embodiments data updates are stored to the in-memory data cache and are not required to be written to the persistent data store before being committed. In some example embodiments the data from a plurality of sources can be stored in parallel very quickly, but the list of changes must be stored in the transaction log sequentially to ensure the integrity of the transaction log and as such, storing data changes to the transaction log takes significantly longer.

In some example embodiments the producer system can receive a truncation point acknowledgement from a consumer. The truncation point acknowledgement is a consumer acknowledgement that the transaction log can be safely truncated by producer. The truncation point is the point in the data change log where the data transfer should be restarted.

In some example embodiments transmitting the data updates to the consumer system (FIG. 1, 102) includes transmitting a list of changes to the data for storage in a transaction log associated with the consumer system (FIG. 1, 102). For example, the same list of changes that is stored in the transaction log at the producer system can be sent to the consumer system for storage.

Figure 5B:
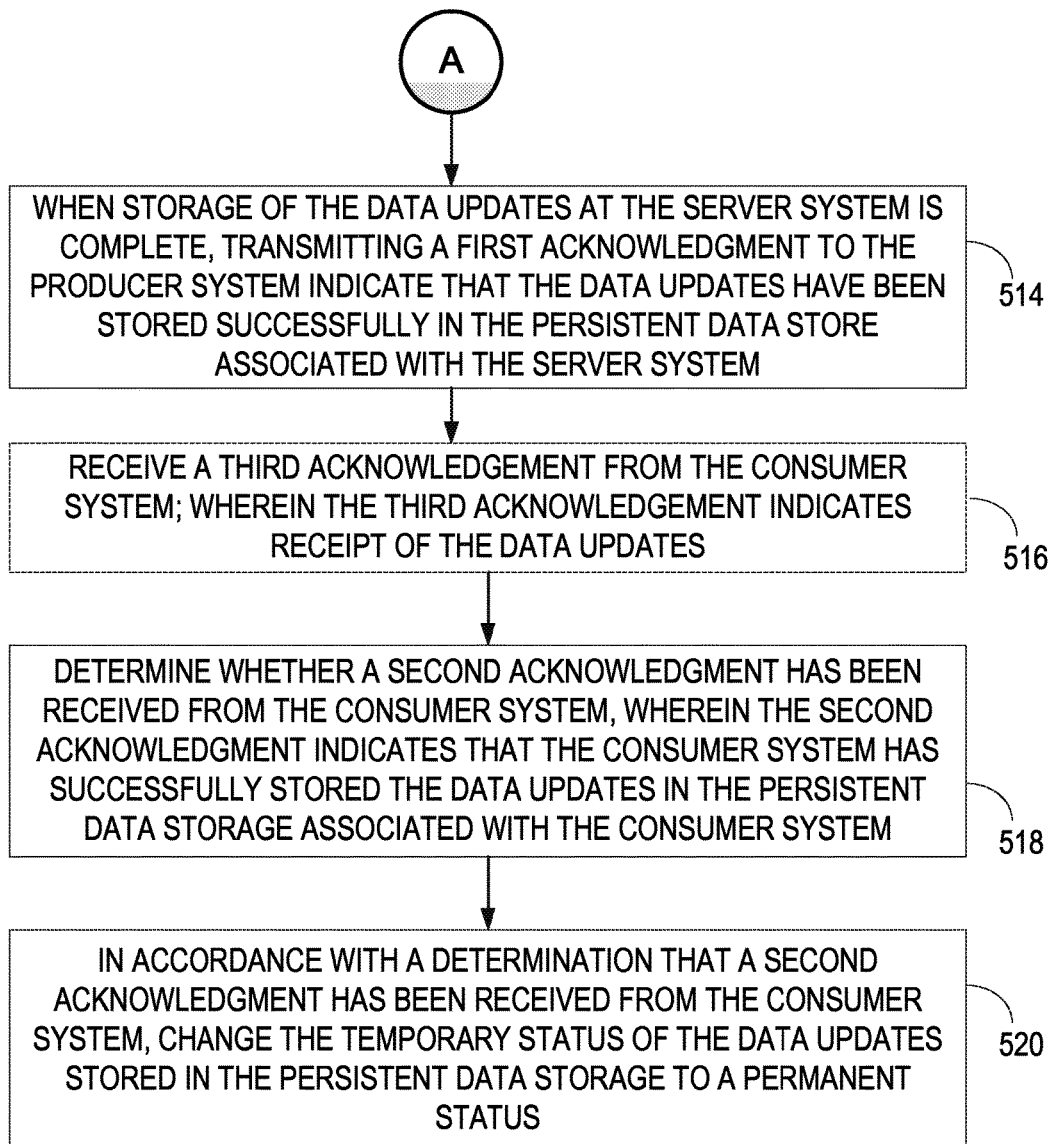

FIG. 5B is a flow diagram illustrating a method 524 for transferring and storing data with zero data loss in accordance with some example embodiments. Each of the operations shown in FIG. 5B may correspond to instructions stored in a computer memory or computer readable storage medium. Optional operations are indicated by dashed lines (e.g., boxes with dashed-line borders). In some example embodiments, the method described in FIG. 5B is performed by the producer system (FIG. 1, 120).

In some example embodiments the method is performed at a computer system including one or more processors and memory storing one or more programs for execution by the one or more processors.

In some example embodiments, when storage of the data updates at the producer system 120 is complete, the producer system (FIG. 1, 120) transmits (514) a first acknowledgment to the consumer system indicating that the data updates have been stored successfully in the persistent data store or change log associated with the producer system (FIG. 1, 120).

In some example embodiments the producer system (FIG. 1, 120) receives (516) a third acknowledgement from the consumer system; wherein the third acknowledgement indicates receipt of the data updates. For example, the producer system sends data updates (actual data or a log of data changes) to the consumer system. Immediately upon receiving the data updates, the consumer system replies with an acknowledgment message to let the producer system know that the data updates have been successfully received and that the consumer system is going to begin storing the data updates.

In some example embodiments the producer system (FIG. 1, 120) determines (518) whether a second acknowledgment has been received from the consumer system 102, wherein the second acknowledgment indicates that the consumer system 102 has successfully stored the data updates in the persistent data storage associated with the consumer system 102, such as data storage 106.

In some example embodiments in accordance with a determination that a second acknowledgment has been received from the consumer system 102, the producer system (FIG. 1, 120) changes (520) the temporary status of the data updates stored in the persistent data storage to a permanent status. In some example embodiments a producer system (FIG. 1, 120) collects multiple data changes and commits them all once all the data changes have been successfully stored. In some example embodiments the multiple data changes were received together as a single transaction.

In some example embodiments the persistent storage associated with the producer system 120 is a case transaction log. In some example embodiments the persistent storage associated with the consumer system 102 is a simple persistent queue.

In some example embodiments, if the producer system 120 detects failure of the consumer system 102 prior to receiving the second acknowledgement, the producer system 120 retransmits the data updates to the consumer system 102. In some example embodiments the producer system notifies the consumer system prior to retransmitting the data updates.

In some example embodiments, the producer system 120 interacts with a plurality of consumer systems and continues to interact with the plurality of consumer systems while waiting for the second acknowledgement from the consumer system 102.

Figure 6:
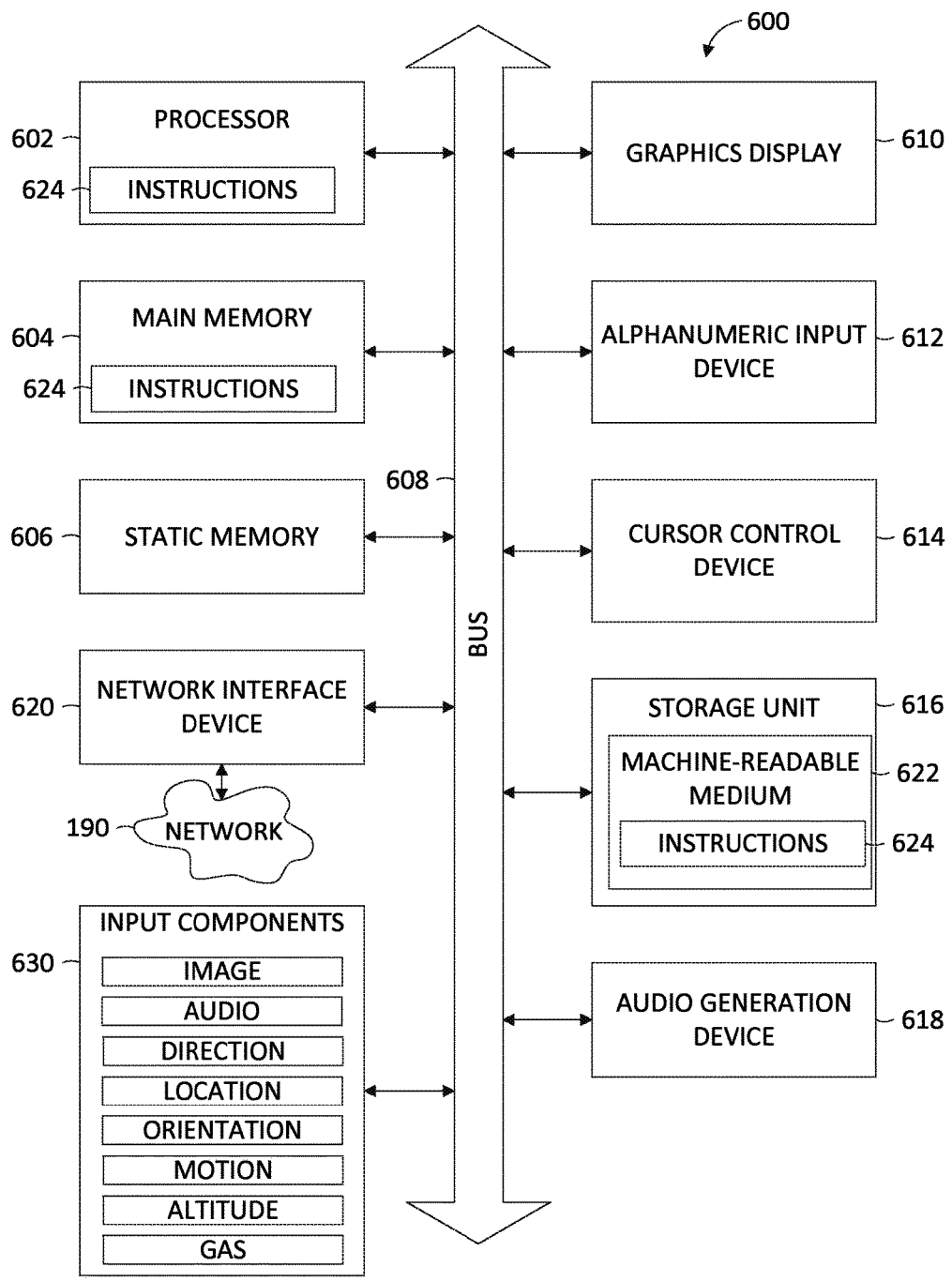
FIG. 6 is a block diagram illustrating components of a machine, according to some example embodiments.

FIG. 6 is a block diagram illustrating components of a machine 600, according to some example embodiments, able to read instructions 624 from a machine-readable medium 622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 6 shows the machine 600 in the example form of a computer system (e.g., a computer) within which the instructions 624 (e.g., software, a program, an application, an applet, an app, or other executable code) for causing the machine 600 to perform any one or more of the methodologies discussed herein may be executed, in whole or in part.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a distributed (e.g., peer-to-peer) network environment. The machine 600 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include any collection of machines that individually or jointly execute the instructions 624 to perform all or part of any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a cursor control device 614 (e.g., a mouse, a touchpad, a trackball, a joystick, a motion sensor, an eye tracking device, or other pointing instrument), a storage unit 616, an audio generation device 618 (e.g., a sound card, an amplifier, a speaker, a headphone jack, or any suitable combination thereof), and a network interface device 620.

The storage unit 616 includes the machine-readable medium 622 (e.g., a tangible and non-transitory machine-readable storage medium) on which are stored the instructions 624 embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered machine-readable media (e.g., tangible and non-transitory machine-readable media). The instructions 624 may be transmitted or received over the network 190 via the network interface device 620. For example, the network interface device 620 may communicate the instructions 624 using any one or more transfer protocols (e.g., hypertext transfer protocol (HTTP)).

In some example embodiments, the machine 600 may be a portable computing device, such as a smart phone or tablet computer, and have one or more additional input components 630 (e.g., sensors or gauges). Examples of such input components 630 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 624 for execution by the machine 600, such that the instructions 624, when executed by one or more processors of the machine 600 (e.g., processor 602), cause the machine 600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
    storing data in a persistent data storage associated with a producer system;
    producing, using one or more processors at the producer system, one or more data updates for the stored data;
    in response to the producing of the data updates, beginning storage of the data updates at the persistent data storage associated with the producer system while simultaneously transmitting the data updates from the producer system to a consumer system, the consumer system configured to initiate storage of the data updates at persistent data storage associated with the consumer system without waiting for the data updates to finish being stored in the persistent data storage associated with the producer system, the beginning of the storage of the data updates at the persistent data storage including setting a finality indicator associated with the storage of the data updates at the persistent data storage of the producer system to false, the initiating of the data storage of the data updates at the persistent data storage associated with the consumer system including setting a finality indicator associated with the storage of the data updates at the persistent storage associated with the consumer system to false;
    successfully storing the data updates in the persistent storage associated with the producer system;
    in response to the successful storing of the data updates to the persistent data storage associated with the producer system, transmitting a first acknowledgment, the first acknowledgment going from the producer system to the consumer system, the consumer system configured to set the finality indicator associated with the storage of the data updates at the persistent data storage associated with the consumer system to to true upon successful storing of the data updates to the persistent data storage associated with the consumer system and receipt of the first acknowledgement;
    receiving a second acknowledgment, the second acknowledgement going from the consumer system to the producer system, the second acknowledgment indicating that the consumer system has successfully stored the data updates at the persistent data storage associated with the consumer system and that the consumer system has set the finality indicator associated with the storage of the data updates at the persistent storage associated with the consumer system to true; and
    based on the receiving of the second acknowledgement and the successful storing of the data updates to the persistent data storage associated with the producer system, setting the finality indicator associated with the storage of the data updates at the persistent data storage associated with the producer system to true.

2. The method of claim 1, further comprising:
    prior to receiving the second acknowledgment from the consumer system, receiving a third acknowledgement at the producer system from the consumer system, wherein the third acknowledgement indicates receipt of the data updates.

3. The method of claim 1, wherein the persistent data storage associated with the producer system comprises a case transaction log.

4. The method of claim 1, wherein the persistent data storage associated with the consumer system comprises a simple persistent queue.

5. The method of claim 1, further comprising:
    retransmitting, by the producer system, the data updates to the consumer system in response to the producer system detecting failure of the consumer system prior to receiving the second acknowledgement.

6. The method of claim 1, further comprising:
    interacting, by the producer system, with a plurality of consumer systems while awaiting, at the producer system, the second acknowledgement from the consumer system.

7. The method of claim 1, wherein the one or more data updates comprise an updated version of the one or more data items stored in the persistent data storage associated with the producer system.

8. The method of claim 1, further comprising:
storing a transaction log at the producer system, wherein the transaction log comprises changes made to the data stored in the persistent data storage associated with the producer system.

9. The method of claim 8, wherein the produced data updates comprise a list of changes made to the data stored in the persistent data storage associated with the producer system.

10. The method of claim 9, wherein storing the data updates at the persistent data storage associated with the producer system comprises:
storing the list of changes associated with the data updates to the transaction log stored at the persistent data storage associated with the producer system.

11. The method of claim 9, wherein transmitting the data updates to the consumer system comprises transmitting the list of changes to the consumer system.

12. A system comprising:
one or more processors;
memory storing instructions that, when executed by at least one of the one or more processors, cause the system to perform operations comprising:
storing data in a persistent data storage associated with the system, the system comprising a producer system;
producing one or more data updates for the stored data;
in response to the producing of the data updates, beginning storage of the data updates at the persistent data storage associated with the producer system while simultaneously transmitting the data updates from the producer system to a consumer system, the consumer system configured to initiate storage of the data updates at persistent data storage associated with the consumer system without waiting for the data updates to finish being stored in the persistent data storage associated with the producer system, the beginning of the storage of the data updates at the persistent data storage including setting a finality indicator associated with the storage of the data updates at the persistent data storage of the producer system to false, the initiating of the data storage of the data updates at the persistent data storage associated with the consumer system including setting a finality indicator associated with the storage of the data updates at the persistent storage associated with the consumer system to false;
successfully storing the data updates in the persistent storage associated with the producer system;
in response to the successful storing of the data updates to the persistent data storage associated with the producer system, transmitting a first acknowledgment, the first acknowledgment going from the producer system to the consumer system, the consumer system configured to set the finality indicator associated with the storage of the data updates at the persistent data storage associated with the consumer system to true upon successful storing of the data updates to the persistent data storage associated with the consumer system and receipt of the first acknowledgement;
receiving a second acknowledgment, the second acknowledgement going from the consumer system to the producer system, the second acknowledgment indicating that the consumer system has successfully stored the data updates at the persistent data storage associated with the consumer system and that the consumer system has set the finality indicator associated with the storage of the data updates at the persistent storage associated with the consumer system to true; and
based on the receiving of the second acknowledgement and the successful storing of the data updates to the persistent data storage associated with the producer system, setting the finality indicator associated with the storage of the data updates at the persistent data storage associated with the producer system to true.

13. The system of claim 12, wherein the operations further comprise:
prior to receiving the second acknowledgment from the consumer system, receiving a third acknowledgement from the consumer system, wherein the third acknowledgement indicates receipt of the data updates.

14. The system of claim 12, wherein the persistent data storage associated with the producer system comprises a case transaction log.

15. The system of claim 12, wherein the persistent data storage associated with the consumer system comprises a simple persistent queue.

16. The system of claim 12, wherein the operations further comprise:
retransmitting the data updates to the consumer system in response to the producer system detecting failure of the consumer system prior to receiving the second acknowledgement.

17. A non-transitory computer readable storage medium storing instructions that, when executed by one or more processors of a producer system, cause the producer system to perform operations comprising:
storing one or more data items in a persistent data storage associated with the producer system;
producing one or more data updates for the stored data;
in response to the producing of the data updates, beginning storage of the data updates at the persistent data storage associated with the producer system while simultaneously transmitting the data updates from the producer system to a consumer system, the consumer system configured to initiate storage of the data updates at persistent data storage associated with the consumer system without waiting for the data updates to finish being stored in the persistent data storage associated with the producer system, the beginning of the storage of the data updates at the persistent data storage including setting a finality indicator associated with the storage of the data updates at the persistent data storage of the producer system to false the initiating of the data storage of the data updates at the persistent data storage associated with the consumer system including setting a finality indicator associated with the storage of the data updates at the persistent storage associated with the consumer system to false;
successfully storing the data updates in the persistent storage associated with the producer system;
in response to the successful storing of the data updates to the persistent data storage associated with the producer system, transmitting a first acknowledgment, the first acknowledgment going from the producer system to the consumer system, the consumer system configured to set the finality indicator associated with the storage of the data updates at the persistent data storage associated with the consumer system to true upon successful storing of the data updates to the persistent data storage associated with the consumer system and receipt of the first acknowledgement;
receiving a second acknowledgment, the second acknowledgement going from the consumer system to the producer system, the second acknowledgment indicating that the consumer system has successfully stored the data updates at the persistent data storage associated with the consumer system and that the consumer system has set the finality indicator associated with the storage of the data updates at the persistent storage associated with the consumer system to true; and based on the receiving of the second acknowledgement and the successful storing of the data updates to the persistent data storage associated with the producer system, setting the finality indicator associated with the storage of the data updates at the persistent data storage associated with the producer system to true.

18. The non-transitory computer readable storage medium of claim 17, wherein the operations further comprise:

prior to receiving the second acknowledgment from the consumer system, receiving a third acknowledgement from the consumer system, wherein the third acknowledgement indicates receipt of the data updates.

19. The non-transitory computer readable storage medium of claim 17, wherein the persistent data storage associated with the producer system comprises a case transaction log.

20. The non-transitory computer readable storage medium of claim wherein the persistent data storage associated with the consumer system comprises a simple persistent queue.

* * * * *